(12) United States Patent
Anbiah et al.

(10) Patent No.: US 6,690,653 B1
(45) Date of Patent: Feb. 10, 2004

(54) SPLIT-SWITCH BASED PNNI HIERARCHY

(75) Inventors: Anix Anbiah, Cranberry, PA (US); John E. Drake, Jr., Pittsburgh, PA (US); Robert Coltun, Rockville, MD (US); Theodore Ernest Tedijanto, Wexford, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/177,217

(22) Filed: Oct. 22, 1998

(51) Int. Cl.[7] .............................................. H04L 12/56
(52) U.S. Cl. ........................ 370/256; 370/390; 370/408
(58) Field of Search .......................... 370/395.1, 395.5, 370/395.51, 230, 256, 255, 254, 351, 400, 425, 408, 401, 257, 258, 390, 407, 389, 471

(56) References Cited

U.S. PATENT DOCUMENTS

| | | | | |
|---|---|---|---|---|
| 5,606,669 A | * | 2/1997 | Bertin et al. ................ | 370/256 |
| 5,831,975 A | * | 11/1998 | Chen et al. .................. | 370/256 |
| 6,201,810 B1 | * | 3/2001 | Masuda et al. ............. | 370/408 |
| 6,243,384 B1 | * | 6/2001 | Eriksson et al. ......... | 370/395.5 |
| 6,304,549 B1 | * | 10/2001 | Srinivasan et al. ......... | 370/230 |
| 6,363,068 B1 | * | 3/2002 | Kinoshita .................... | 370/408 |

* cited by examiner

*Primary Examiner*—Chau Nguyen
*Assistant Examiner*—Soon-Dong Hyun
(74) *Attorney, Agent, or Firm*—Ansel M. Schwartz

(57) ABSTRACT

A telecommunications system. The system includes a first area. The system includes a second area connected to the first area to form a single physical network for routing connections and in which there is selective propagation of information between each area in the network. A split switch. The split switch includes a first node adapted to be disposed in a first area. The split switch includes a second node adapted to be disposed in a second area. The second node is in communication with the first node. The first node prevents information from propagating into the first area from the second area which was provided to the second area from the first area or arose from the first area. A method for routing connections. The method includes the steps of propagating information concerning a connection from a first area of a physical network to a second area of the physical area. Then there is the step of preventing the information from forming a routing loop back to the first area.

16 Claims, 5 Drawing Sheets

SPLIT-SWITCH BASED PNNI HIERARCHY

FIELD OF THE INVENTION

The present invention is related to the selective propagation of information between each area in a network. More specifically, the present invention is related to the prevention of routing loops and route leaking policies between areas of a network.

BACKGROUND OF THE INVENTION

The Asynchronous Transfer Mode (ATM) Forum has defined a specification called PNNI (Private Network-Network Interface or Private Node-Node Interface) [*Private Network-Network Interface Specification* v1.0, The ATM Forum, af-pnni-0055.000, March 1996, incorporated by reference herein] for routing connections in an ATM network. This protocol is designed to scale to very large networks using the concept of hierarchical routing.

Although PNNI addresses scalability of private networks, it does not sufficiently address building a global ATM network comprising several PNNI areas. (An example of such a network would be a network of several enterprise networks inter-connected by one or more public carrier networks. In this case, each enterprise network and each of the public networks would be an individual PNNI area.) Especially, PNNI does not address implementation of policies for route leaking, summarization and suppression at the edges that separate the individual areas.

The present invention is directed to an architecture called Split-Switch Hierarchy which allows multiple PNNI areas to be connected into a single physical network and allows implementation of policies for leaking, summarizing and suppressing routing information being propagated between individual PNNI areas.

SUMMARY OF THE INVENTION

The present invention pertains to a telecommunications system. The system comprises a first area. The system comprises a second area connected to the first area to form a single physical network for routing connections and in which there is selective propagation of information between each area in the network.

The present invention pertains to a split switch. The split switch comprises a first node adapted to be disposed in a first area. The split switch comprises a second node adapted to be disposed in a second area. The second node is in communication with the first node. The first node prevents information from propagating into the first area from the second area which was provided to the second area from the first area or arose from the first area.

The present invention pertains to a method for routing connections. The method comprises the steps of propagating information concerning a connection from a first area of a physical network to a second area of the physical area. Then there is the step of preventing the information from forming a routing loop back to the first area.

BRIEF DESCRIPTION OF THE DRAWINGS

In the accompanying drawings, the preferred embodiment of the invention and preferred methods of practicing the invention are illustrated in which.

DETAILED DESCRIPTION

Figure 2:
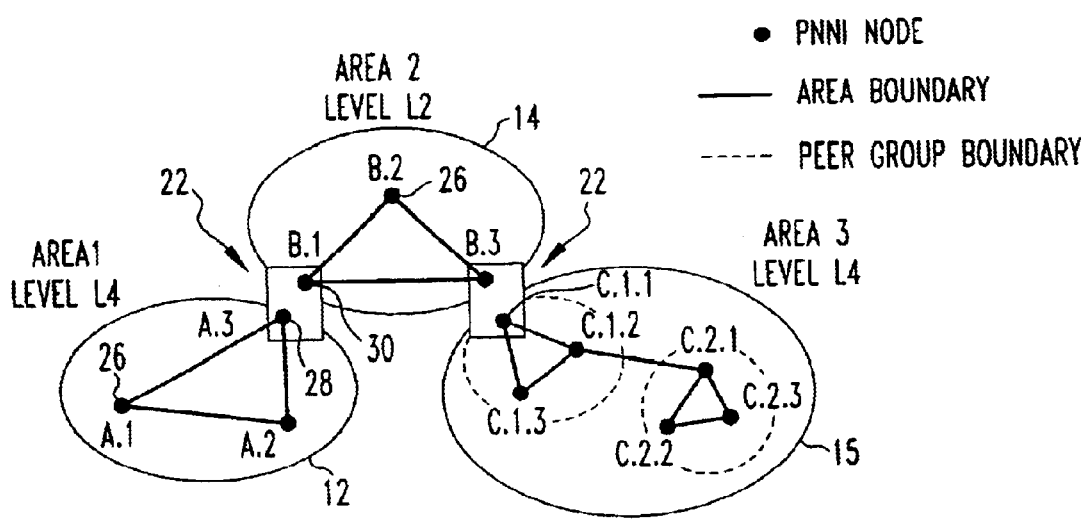
FIG. 2 is a schematic representation of a split-switch hierarchical network.
Figure 10:
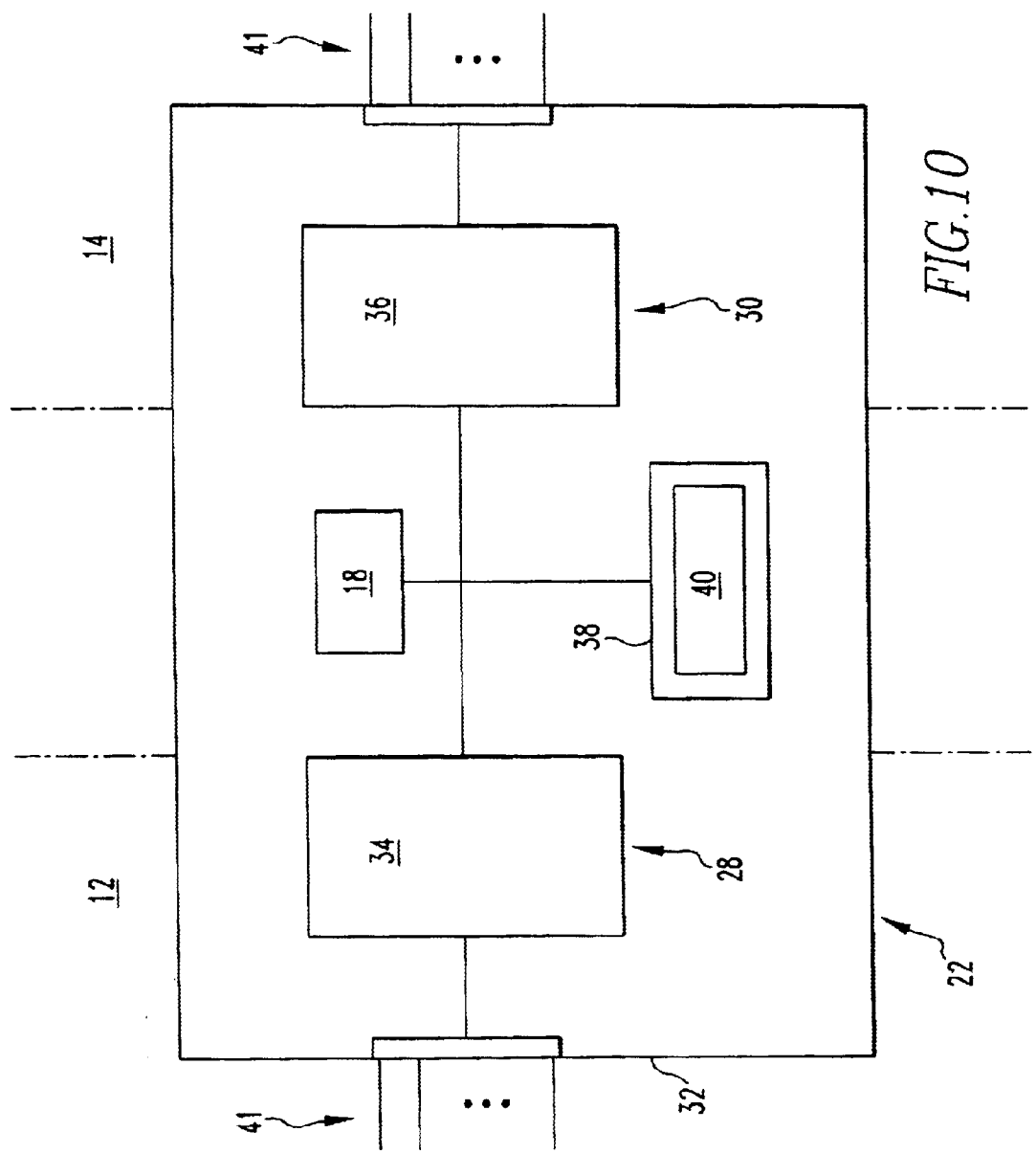
FIG. 10 is a schematic representation of a split-switch.

Referring now to the drawings wherein like reference numerals refer to similar or identical parts throughout the several views, and more specifically to FIGS. 2 and 10 thereof, there is shown a telecommunications system 10. The system 10 comprises a first area 12. The system 10 comprises a second area 14 connected to the first area 12 to form a single physical network 11 for routing connections and in which there is selective propagation of information between each area in the network 11.

Preferably, the first area 12 belongs to a first administrative domain and the second area 14 belongs to a second administrative domain and routing loops are prevented between each area. The selective propagation of information in the network 11 preferably includes allowance or suppression of the propagation of information between each area. Preferably, the system 10 includes n additional areas that together with the first and second areas form the network 11, where n is greater than or equal to one and all the areas are in communication with each other, and n additional administrative groups with each area having a corresponding administrative group.

Each area is preferably connected to another area through a switch mechanism 16. Preferably, each switch mechanism 16 has a controller 18 for preventing routing loops and allowance or suppression of information between areas to which the switch mechanism 16 is connected. Each area is preferably a PNNI area. Preferably, the network 11 is an ATM network 11. The switch mechanism 16 preferably includes a split-switch 22.

Preferably, the areas of the network 11 are arranged so they are subject to hierarchical routing. The first area 12 and the second area 14 preferably each have nodes 20 and the nodes 20 are logically grouped and summarized by a logical group node in each of the first and second areas and the logical group nodes 20 form a logical group node hierarchy. Preferably, the split-switch 22 prevents information from propagating back into an area that provided the information to the split-switch 22.

Each area preferably has a level. A split-switch preferably connects two areas, one at a higher level than the other. The split-switch prevents information from propagating from a given lower level area into any higher level area or any area at the same level as the given area if the information was propagated into the given area from a higher level area. Preferably, any area can be connected to any number of areas at the level of the area or at a lower level of the area, but can only be connected to one area at a level higher than its level.

The first area 12 preferably includes a first area node 24. The first area node 24 advertises a reachability prefix R and a source area to the split-switch 22 when the first area node 24 desires to accept connections from the second area destined for addresses with prefix R. Preferably, the split-switch advertises prefix R into the second area with an associated scope when the first area node desires to accept connections from the second area destined for addresses with prefix R.

The present invention pertains to a split-switch 22, as shown in FIG. 10. The split-switch 22 comprises a first node 28 adapted to be disposed in a first area 12. The split-switch 22 comprises a second node 30 adapted to be disposed in a second area 14. The second node 30 is in communication with the first node 28. The first node 28 prevents information from propagating into the first area 12 from the second area 14 which was provided to the second area 14 from the first area 12 or arose from the first area 12.

Preferably, the first area 12 has a first level and the second area 14 has a second level lower or higher than the first level. The first area 12 preferably has an ID and the second area 14 has an ID, and the first node 28 has the ID of the first area 12 and the second node 30 has the ID of the second area 14.

Preferably, the split-switch 22 includes a cabinet 32 in which the first node 28 and second node 30 are disposed. The first node 28 and the second node 30 preferably include a first switch portion 34 and a second switch portion 36, respectively. Preferably, the split-switch 22 includes a shared memory 38 connected to the first switch portion 34 and the second switch portion 36. The shared memory 38 has a prefix table 40 in which prefixes are stored. The split-switch 22 preferably includes a controller 18 connected to the shared memory 38, first switch portion 34 and second switch portion 36 which controls whether the prefixes are served or discarded. Preferably, the split-switch 22 includes ports which receive prefixes or send prefixes. The ports are connected to the controller 18 and the shared memory 38.

The present invention pertains to a method for routing connections. The method comprises the steps of propagating information concerning a connection from a first area 12 of a physical network 11 to a second area 14 of the physical area. Then there is the step of preventing the information from forming a routing loop back to the first area 12.

Preferably, the first area 12 and the second area 14 each have a level and after the propagating step there is the step of preventing leaking of information to other areas of the physical network having a level at or above the level of the second area 14 if the first area level is higher than the second area level. The preventing step preferably includes the step of advertising a reachability prefix R with a source area by the first area 12 to the second area 14, where the source area is the first area 12, and R indicates a prefix of addresses to which connections can be established originating from the second area 14 and terminating either at the first area 12 or at another area with the first area 12 serving as a transit.

Preferably, after the advertising step, there are the steps of changing the source area to the second area 14; and advertising R to a third area 15. The prefix R preferably has a scope which indicates a limit on the level of an area that R can be propagated into and the leaking preventing step includes the steps of advertising R and the scope and the source area; and preventing R from propagating into any area having a level at or higher than the scope. Preferably, after the R preventing step there is the step of propagating R from a first area into a second area having a level lower than the scope and maintaining the scope the same with R if the first area level is lower than the second area level.

After the propagating step, there is preferably the step of propagating R from a first area to a second area having a level lower than the level of the first area and changing the scope to the level of the area in which R is propagating into so R cannot propagate into any area at or higher than the level of the area R has propagated into. Preferably, the leaking preventing step includes the step of summarizing a range of addresses from the first area 12 into a single prefix R at a split-switch 22 that connects the first area 12 and the second area 14.

The leaking preventing step preferably includes the step of suppressing a range of addresses from leaking from the first area 12 into the second area 14 at the split-switch 22. Preferably, the leaking preventing step includes the step of allowing explicitly the advertising of individual prefixes in a range of prefixes from the first area 12 to the second area 14 at the split-switch 22.

The following definitions are applicable for a better understanding of the operation of the preferred embodiment.

Area

An Area is a sub-network that is implemented either as a single PNNI peer group or as multiple PNNI peer groups participating in an LGN Hierarchy.

Hierarchical Routing

A method of improving the scalability of a PNNI network 11 by grouping PNNI nodes 20 into logical groups and summarizing information about nodes 20 in a logical group to nodes 20 outside the logical group.

LGN Hierarchy

Figure 1:
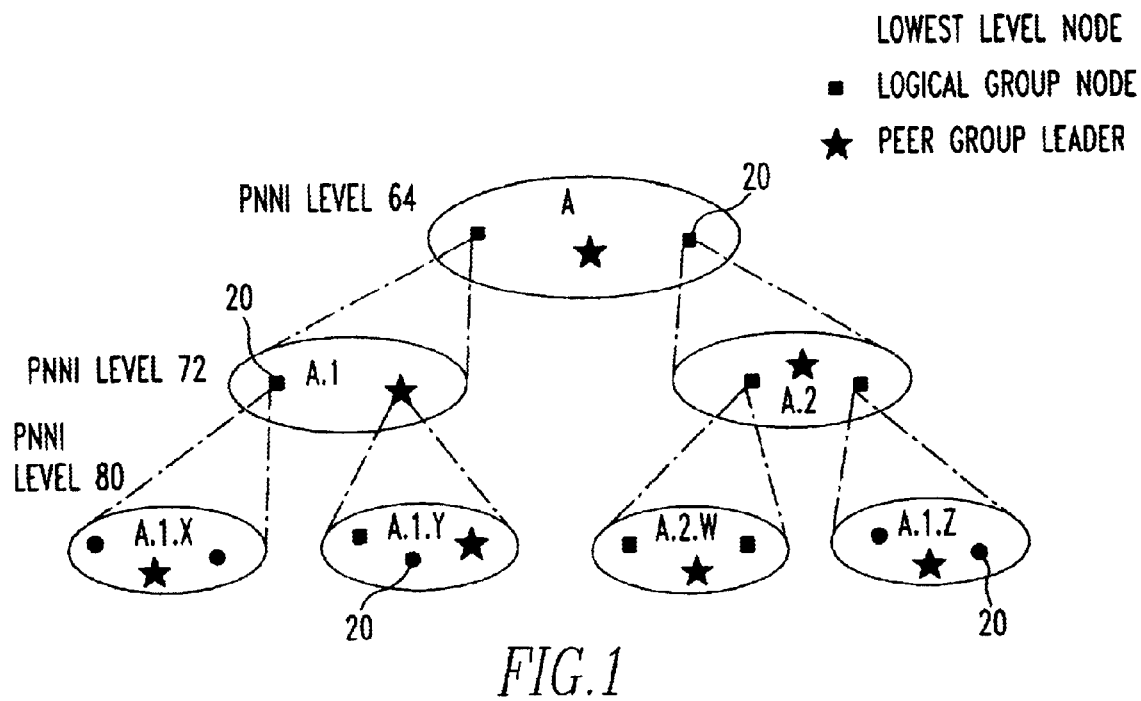
FIG. 1 is a schematic representation of an LGN hierarchy.

A routing hierarchy where PNNI nodes 20 are logically grouped and summarized by a Logical Group Node (LGN) and LGNs are recursively grouped into logical groups themselves in a multi-level hierarchy. Shown in FIG. 1 is an example of an LGN Hierarchy.

Node

A node is a logical entity residing in an ATM switch that executes and instance of the PNNI routing protocol. A node belongs to a specific area and exists either at the lowest level of the PNNI hierarchy or as a Logical Group Node in the hierarchy.

PNNI

Routing/Signaling protocol defined by the ATM Forum, incorporated by reference herein, for use in ATM networks 11.

Reachability Information

An address prefix which represents either a single ATM address or a range of ATM addresses (summarized as a single address prefix) and is used to advertise reachability to that ATM address or to those addresses either at a PNNI node or within an area.

Split-Switch

A Split-Switch is one that has multiple PNNI nodes 20 in it, each node being part of a different area. For example, in FIG. 2, nodes A.3 and B.1 are in a split-switch, A.3 being part of area 1 and B.1 being part of area 2.

Split-Switch Hierarchy

A split-switch hierarchy is a routing hierarchy where switches are grouped into areas and individual areas are connected to one or more areas using split-switches. An individual area in the split-switch hierarchy may itself be implemented as an LGN Hierarchy. For this reason, it is appropriate to think of the Split-Switch Hierarchy as a super hierarchy. FIG. 2 shows an example of a split-switch hierarchical network 11.

In the operation of the preferred embodiment, most large ATM networks spanning multiple organizations are likely to be built as areas of PNNI networks. Individual areas will be connected using split-switches with multiple logical PNNI nodes 20. A split-switch has one logical PNNI node in each of the areas that it connects. This configuration of PNNI networks is likely because it is difficult to come up with a uniform addressing scheme for PNNI peer groups and uniform assignment of levels to the peer groups across the different administrative domains of a given ATM network 11, which are essential for configuring the entire ATM network 11 as a single PNNI area under a single PNNI LGN Hierarchy.

In a split-switch hierarchy, the network 11 is logically divided into areas. Each area is implemented either as a single PNNI peer group or as multiple PNNI peer groups organized in an LGN Hierarchy. In the latter case, since split-switch hierarchy becomes a hierarchy of hierarchies, it can be thought of as a super hierarchy. FIG. 2 shows an example of a network 11 implemented in a split-switch hierarchy. Note that areas 1 and 2 are implemented as a single peer group whereas area 3 is implemented as an LGN Hierarchy with two peer groups (the LGNs are not shown in FIG. 2).

Each PNNI node in each split-switch of a split-switch hierarchy needs to be configured with two elements. These are:

1. The ID of the area to which the node belongs. Each area in the split-switch hierarchy is given an unique area ID. For example in FIG. 2, the PNNI node A.3 is configured with area ID 1 and the PNNI node B.1 is configured with area ID 2.
2. The level of the area to which the node belongs. Areas in a split-switch hierarchy are arranged in a hierarchy at discrete levels, with each area existing at one of the discrete levels. Levels are denoted as Li where i is a non-zero positive integer. The larger the value of i (numerically), the lower level Li is in the split-switch hierarchy. For example, the PNNI node A.3 is configured with level L4 and the PNNI node B.1 is configured with level L2. B.1 belongs to area 2 which is at a higher level than area 1 to which A.3 belongs.

Figure 3:
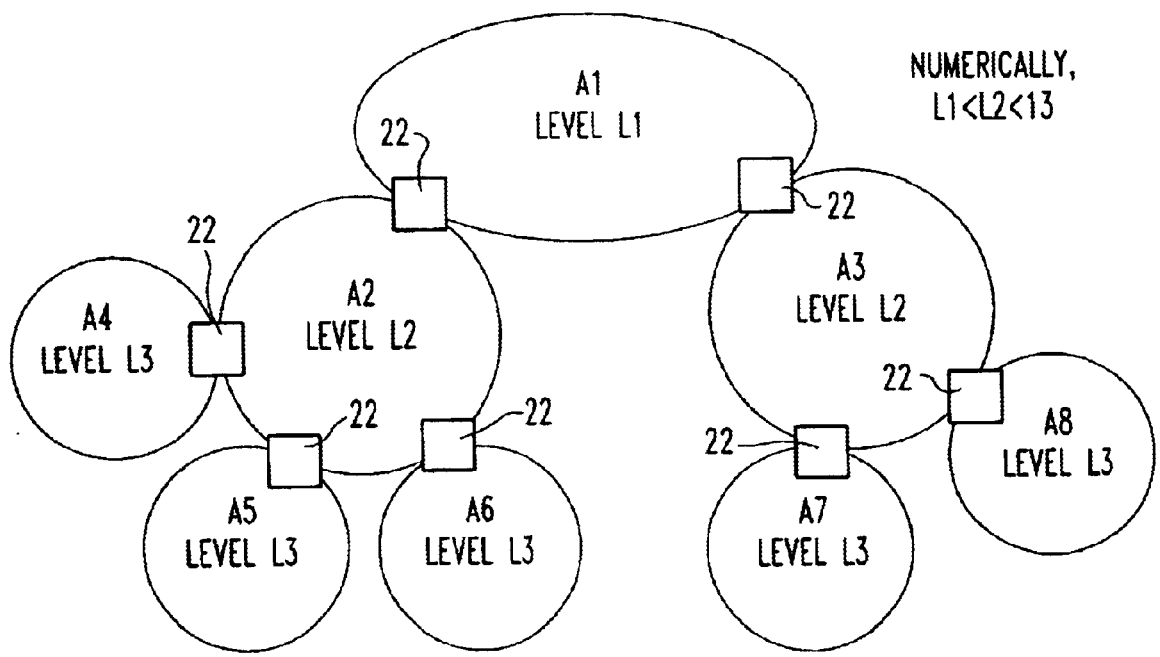
FIG. 3 is a schematic representation of an example of an area configuration.

Areas are connected to other areas using split-switches 22. Each area at a given level Li can be connected to any number of areas at level Li or lower, but it can be connected to only one area at a level higher than Li. This is illustrated in FIG. 3. Note that each area at Level L3 connects to only one area at Level L2. Similarly, each area at Level L2 connects to only one area at Level L1.

Figure 4:
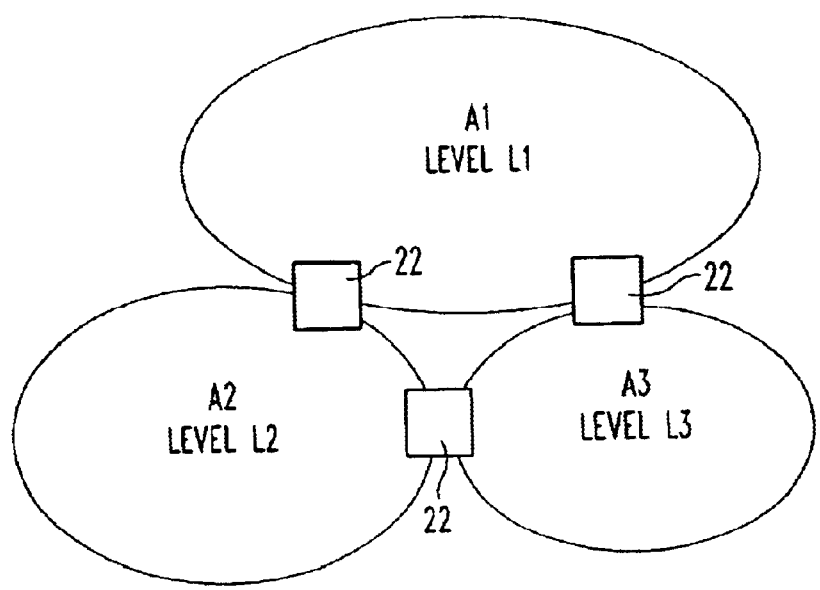
FIG. 4 is a schematic representation of an example of an illegal area configuration.

Shown in FIG. 4 is an illegal configuration of areas. In FIG. 4, the shown configuration is illegal because area A3 at level L3 is connected to two areas A1 and A2, both at higher levels than A3, since L1 and L2 are higher levels than L3.

In the split-switch hierarchy architecture, several important issues need to be addressed. These issues are:

1. Prevention of routing loops.
   Since in the split-switch hierarchy, there can be multiple ways to go from one area to another area, there is a chance of routing loops where a piece of reachability information gets originated from a specific area and gets propagated through the network 11 and finally into the originating area. Such a routing loop can cause major problems in a network 11 such as routing update storms and computation of invalid source routes (and failed call setups as a result).
2. Implementation of Route Leaking Policies.
   Since different areas in a network 11 most likely belong to different administrative domains (possibly belonging to different enterprises or companies), there is a security issue of being able to selectively allow or suppress propagation of addresses belonging to one area into other areas.

In the split-switch hierarchy, it is fairly easy to implement such policies since propagation of reachability information between areas happens at the split-switches 22 and hence such policies need to be implemented at the split-switches 22 only. These split-switches 22 act as gateway points through which all reachability information flows.

Solutions for the two aforesaid issues are now described. Routing loops can occur in a split-switch hierarchy in two different ways. These two ways are illustrated below.

Figure 5:
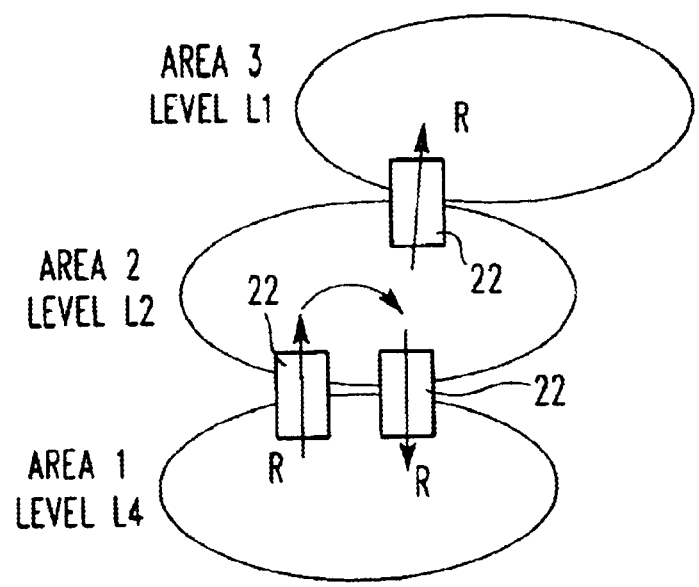
FIG. 5 is a schematic representation of a routing loop due to multiple split-switches.

In FIG. 5, area 1 and area 2 are connected using two split-switches 22. A reachability prefix R is originated from area 1, is leaked to area 2 through one split-switch 22 and re-enters area 2 through the other split-switch 22. This form of routing loops can be easily prevented if each piece of reachability information is advertised with a source area. For example, in this case, when R is advertised into area 2 by the first split-switch 22, the fact that R was imported from area 1 is advertised along with R. When this advertisement propagates through area 2 using normal PNNI flooding and reaches the second split-switch 22, it will not be further propagated back into area 1 since area 1 is indicated as the source area of R.

Note that as R propagates through several levels of hierarchy, the source area of R will change at each split-switch 22 that exports R into a new area. For example, when R is propagated from area 2 into area 3, the source area of R becomes area 2. This will prevent R from leaking back into area 2 if there are multiple split-switches connecting area 2 with area 3.

Figure 6:
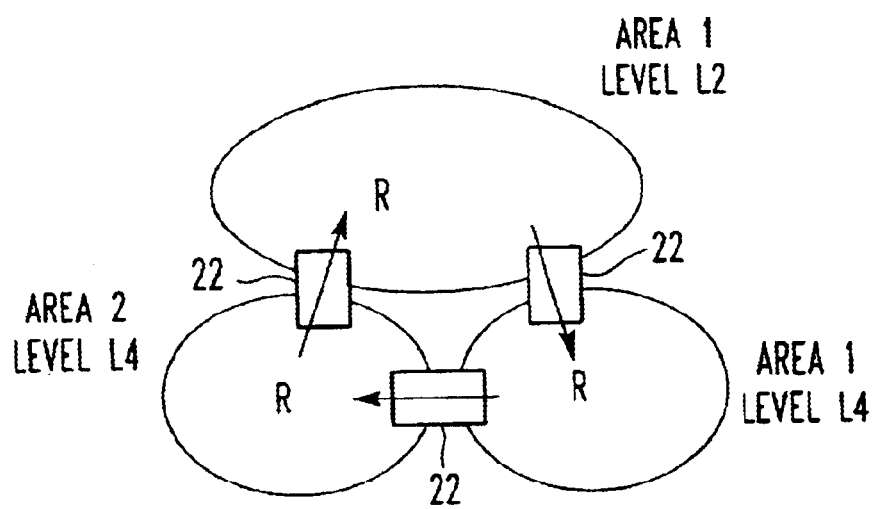
FIG. 6 is a schematic representation of route leaking due to lateral leaking.

Routing loops can occur in a split-switch hierarchy when a piece of reachability information propagates up the hierarchy, down the hierarchy and then laterally into the originating area. This is illustrated in FIG. 6. In this FIG. 6, area 2 and area 3 are laterally connected (they are at the same level and they have a split-switch connecting them). This is a legal configuration of the hierarchy. As shown in the FIG. 6, R, a reachability prefix, can be originated from area 2, propagate up the hierarchy into area 1, then down the hierarchy into area 3 and finally laterally into area 1, creating a routing loop.

Routing loops due to lateral leaking can be prevented by advertising along with R, an attribute called the scope of the prefix. The scope value indicates a limit on the level of the area R can be propagated into. If the scope of R at any given stage of R's propagation through the hierarchy is i, then, R cannot be propagated into any area at or above the level Li. For example, if the scope of R is 4, then R cannot be propagated further into any area at level L4 or higher.

As R propagates through the hierarchy, the scope of R changes. When R is propagated up the hierarchy, the scope remains unchanged. When R propagates down the hierarchy from an area at level Li to an area at level Lj, (where, numerically, i<j), then the scope of R becomes j. This will prevent R from getting propagated further into any area at level Lj or lower.

As mentioned above, different areas in a network 11 most likely belong to different administrative domains. It is important to implement Route Leaking policies to control the leaking of PNNI reachability information between different areas. This is important for two reasons.

1. Security—It is important to be able to prevent addresses from leaking from one administrative domain to other administrative domains.
2. Efficient Address Summarization—In order to minimize the number of reachability prefixes leaked from on area to another area, it becomes necessary to efficiently summarize the addresses reachable in each area with summary prefixes and leak only the summary prefixes.

Again, as mentioned above, in the split-switch hierarchy, it is fairly easy to implement such policies since propagation of reachability information between areas happens at the split-switches 22 and hence such policies need to be implemented at the split-switches 22 only. These split-switches 22 act as gateway points through which all reachability information flows.

Route Leaking policies can be one of three types:
1. Summary Policy—A policy that summarizes a range of addresses into a single prefix.
2. Suppress Policy—A policy that suppresses a range of addresses from leaking from one area into another area.
3. Advertise Policy—A policy that allows the explicit advertisement of individual prefixes in a range of prefixes.

Route Leaking Policies are implemented as "import policies". In other words, policies are defined at each node of a split-switch 22 to control the way the node imports reachability information from other nodes in the split-switch 22.

Figure 7:
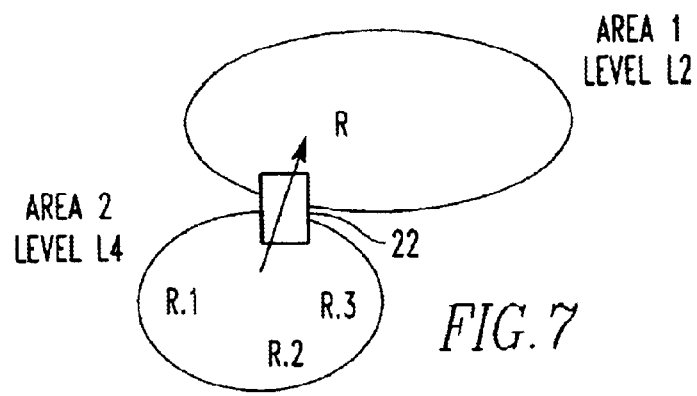
FIG. 7 is a schematic representation of an address summarization policy.

In FIG. 7, a split-switch 22 is shown connecting two areas area 1 and area 2. The split-switch 22 contains two nodes, node 1 in area 1 and node 2 in area 2. Lets say that R.1, R.2 and R.3 are reachability addresses, advertised within area 2. On node 2 of the split-switch 22, let say that a summary policy is defined to summarize all addresses that can be summarized with the summary prefix R as R before advertising these prefixes into area 1. As a result of this policy, R.1, R.2 and R.3 will not be advertised as individual addresses into area 1. Rather, they will get summarized into a single prefix R.

Figure 8:
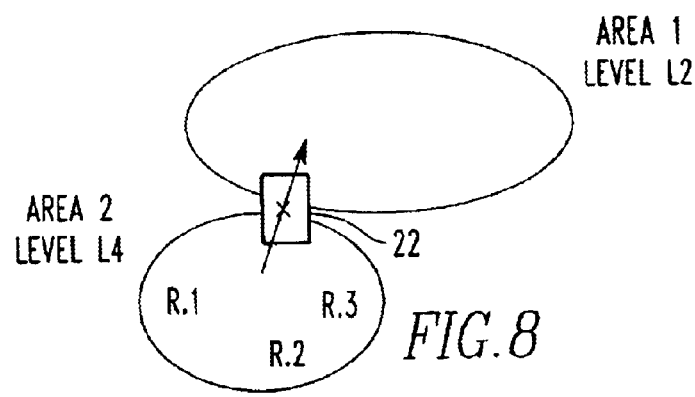
FIG. 8 is a schematic representation of an address suppression policy.

In FIG. 8, an example of how a suppress policy works is shown. As in the previous example, let R.1, R.2 and R.3 be addresses advertised within area 2. Now, lets suppose that these addresses are private to area 2 and should not be leaked into other areas. This can be enforced by configuring a suppress policy on node 1 to suppress all addresses that have R as a prefix. So, in this example, node 1 has a suppress policy for prefix R which will prevent R.1, R.2 and R.3 from being advertised into area 1.

Figure 9:
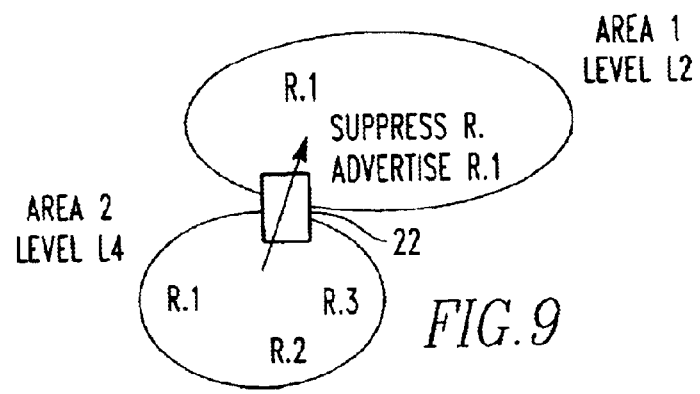
FIG. 9 is a schematic representation of address suppression and advertise policies.

In FIG. 9, an example of how an advertise policy would work is show. In FIG. 9, as in the previous examples, two areas are shown. Also, let R.1, R.2 and R.3 be prefixes advertised within area 2. Lets say that as in the previous example, these addresses are private to area 2, except R.1. Due to this, a set of policies need to be implemented on the split-switch 22 for node 1 so that all addresses with prefix R are suppressed, except R.1. This can be implemented easily by implementing two policies, one to suppress prefix R and one to explicitly advertise R.1 (an advertise policy).

Note that when two or more policies can be applied to any given address, then the policy that is defined for the longest prefix takes precedence. For example in this case, for address R.1, both of the above mentioned policies apply (suppress R and advertise R.1). However, since R.1 is a longer prefix match than R, the advertise policy takes precedence over the suppress policy.

The split-switch 22 preferably has a cabinet 32 in which the first node 28 of the first area 12 includes a first switch portion 34 disposed in the cabinet 32 and the second node 30 of the second area 14 includes a second switch portion 36 disposed in the cabinet 32. The split-switch 22 also comprises a shared memory 38 disposed in the cabinet 32 which is connected to the first switch portion 34 and the second switch portion 36. The shared memory 38 maintains a prefix table 40 of all prefixes that arrive at the split-switch 22 for service. With each prefix is also stored the scope and source area of the prefix in the shared memory 38. The split-switch 22 also has a controller 18 disposed in the cabinet 32 in which the policies described herein are maintained. After a prefix is serviced at the split-switch 22 from the first area 12 and stored in the shared memory 38 for service by the second switch portion 36, the controller 18 reviews the prefixes and associated information to determine if any of the policies in it are violated. If they are, the prefix is discarded. A prefix arriving at the split-switch 22 from the second area 14 for service by the first switch portion 34 is processed in the same manner.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:
   a first area belonging to a first administrative domain;
   a second area belonging to a second administrative domain, the second area connected to the first area to form a single physical ATM network for routing connections and in which there is selective propagation of information between each area in the network which includes allowance or suppression of the propagation of information between each area and routing loops are prevented between each area; and
   n additional areas that together with the first and second areas form the network, where n is greater than or equal to one and all the areas are in communication with each other, and n additional administrative groups with each area having a corresponding administrative group, each area is connected to another area through a switch mechanism that includes a split switch which prevents information from propagating back into an area that provided the information to the split switch, each switch mechanism has a control mechanism for preventing routing loops and allowance or suppression of information between areas to which the switch mechanism is connected, each area is a PNNI area, the areas of the network are arranged so they are subject to hierarchical routing, the first area and the second area each have nodes and the nodes are logically grouped and summarized by a logical group node in each of the first and second areas and the logical group nodes form a logical group node hierarchy, each area has a level and a split switch prevents information from propagating from a given lower level area into any higher level area or any area at the same level as the given area if the information was propagated into the given area from a higher level area.

2. A system as described in claim 1 wherein any area can be connected to any number of areas at the level of the area or at a lower level of the area, but can only be connected to one area and a level higher than its level.

3. A system as described in claim 2 wherein the first area includes a first area node, said first area node advertises a reachability prefix R and a source area to the split switch when the first area node desires to accept connections from the second area destined for addresses with prefix R.

4. A system as described in claim 2 wherein the split-switch advertises prefix R into the second area with an associated scope when the first area node desires to accept connections from the second area destined for addresses with prefix R.

5. A split switch comprising:

a first node disposed in a first area;

a second node disposed in a second area, said second node in communication with said first node, said first node preventing information from propagating into the first area from the second area which was provided to the second area from the first area or arose from the first area, the first area has a first level and the second area has a second level lower or higher than the first level, the first area has an ID and the second area has an ID, and the first node has the ID of the first area and the second node has the ID of the second area, the first node and the second node include a first switch portion and a second switch portion, respectively;

a cabinet in which the first node and second node are disposed; and a shared memory connected to the first switch portion and the second switch portion, said shared memory having a prefix table in which prefixes are stored.

6. A split switch as described in claim 5 including a controller connected to the shared memory, first switch portion and second switch portion which controls whether the prefixes are served or discarded.

7. A split switch as described in claim 6 including ports which receive prefixes or send prefixes, said ports connected to the controller and the shared memory.

8. A method for routing connections comprising the steps of:

propagating information concerning a connection from a first area having a level of a physical network to a second area having a level of the physical network;

preventing the information from forming a routing loop back to the first area; and preventing leaking of the information to other areas of the physical network having a level at or above the level of the second area if the first area level is higher than the second area level, wherein the second area is connected by a first split switch to the first area and to at least another area at the level of the second area of the other areas, the another area connected by a second split switch to the first area.

9. A method as described in claim 8 wherein the preventing step includes the step of advertising a reachability prefix R with a source area by the first area to the second area, where the source area is the first area, and R indicates a prefix of addresses to which connections can be established originating from the second area and terminating either at the first area or at another area with the first area serving as a transit.

10. A method as described in claim 9 including after the advertising step there are the steps of changing the source area to the second area; and advertising R to a third area.

11. A method as described in claim 10 wherein the prefix R has a scope which indicates a limit on the level of an area that R can be propagated into and the leaking preventing step includes the steps of advertising R and the scope and the source area; and preventing R from propagating into any area having a level at or higher than the scope.

12. A method as described in claim 11 wherein after the R preventing step there is the step of propagating R from a first area into a second area having a level lower than the scope and maintaining the scope the same with R if the first area level is lower than the second area level.

13. A method as described in claim 12 including after the propagating R step there is the step of propagating R from a first area to a second area having a level lower than the level of the first area and changing the scope to the level of the area in which R is propagating into so R cannot propagate into any area at or higher than the level of the area R has propagated into.

14. A method has described in claim 13 wherein the leaking preventing step includes the step of summarizing a range of addresses from the first area into a single prefix R at a split switch that connects the first area and the second area.

15. A method as described in claim 14 wherein the leaking preventing step includes the step of suppressing a range of addresses from leaking from the first area into the second area at the split switch.

16. A method as described in claim 15 wherein the leaking preventing step includes the step of allowing explicitly the advertising of individual prefixes in a range of prefixes from the first area to the second area at the split switch.

* * * * *